United States Patent
Nakagawara et al.

[11] Patent Number: 5,859,741
[45] Date of Patent: Jan. 12, 1999

[54] METHOD OF POSITIONING A MAGNETIC HEAD

[75] Inventors: Kazuhiko Nakagawara, Mitaka; Nobuki Matsui, Musashino; Hideaki Saga, Fussa, all of Japan

[73] Assignee: Teac Corporation, Tokyo, Japan

[21] Appl. No.: 646,028

[22] Filed: May 7, 1996

Related U.S. Application Data

[62] Division of Ser. No. 278,938, Jul. 22, 1994.

[30] Foreign Application Priority Data

Aug. 2, 1993 [JP] Japan .................. 5-191383

[51] Int. Cl.$^6$ .................. G11B 21/10
[52] U.S. Cl. .................. 360/77.13
[58] Field of Search .......... 360/70, 75, 77.12, 360/77.13, 69, 84, 109, 106, 76, 77.14

[56] References Cited

U.S. PATENT DOCUMENTS

| | | | |
|---|---|---|---|
| 2,772,328 | 11/1956 | Lyon | 360/84 X |
| 2,900,444 | 8/1959 | Camras | 360/107 X |
| 2,929,633 | 3/1960 | Hoshino et al. | 360/107 X |
| 5,251,086 | 10/1993 | Beisner et al. | 360/109 X |
| 5,287,225 | 2/1994 | Sukigara | 360/77.13 X |
| 5,450,257 | 9/1995 | Tran et al. | 360/77.12 X |
| 5,585,978 | 12/1996 | Rottenburg et al. | 360/85 |

FOREIGN PATENT DOCUMENTS

WO 93/26005  12/1993  WIPO .................. 360/70

*Primary Examiner*—W. R. Young
*Attorney, Agent, or Firm*—Andrus, Sceales, Starke & Sawall

[57] ABSTRACT

An apparatus for positioning at least one magnetic head relative to a magnetic tape for recording and reproducing information includes a head unit for holding at least one magnetic head and a moving unit for moving the head unit parallel to a surface of the magnetic tape in a direction along the width of the magnetic tape so that the head unit is kept at a constant angle relative to the surface of the magnetic tape.

2 Claims, 9 Drawing Sheets

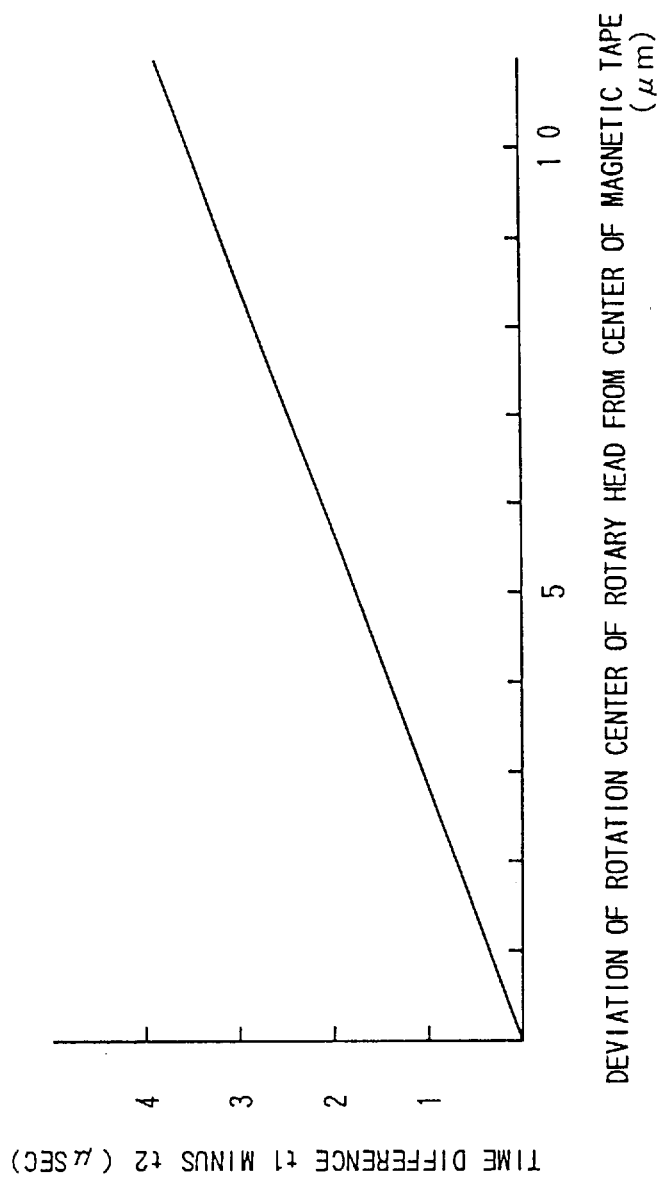

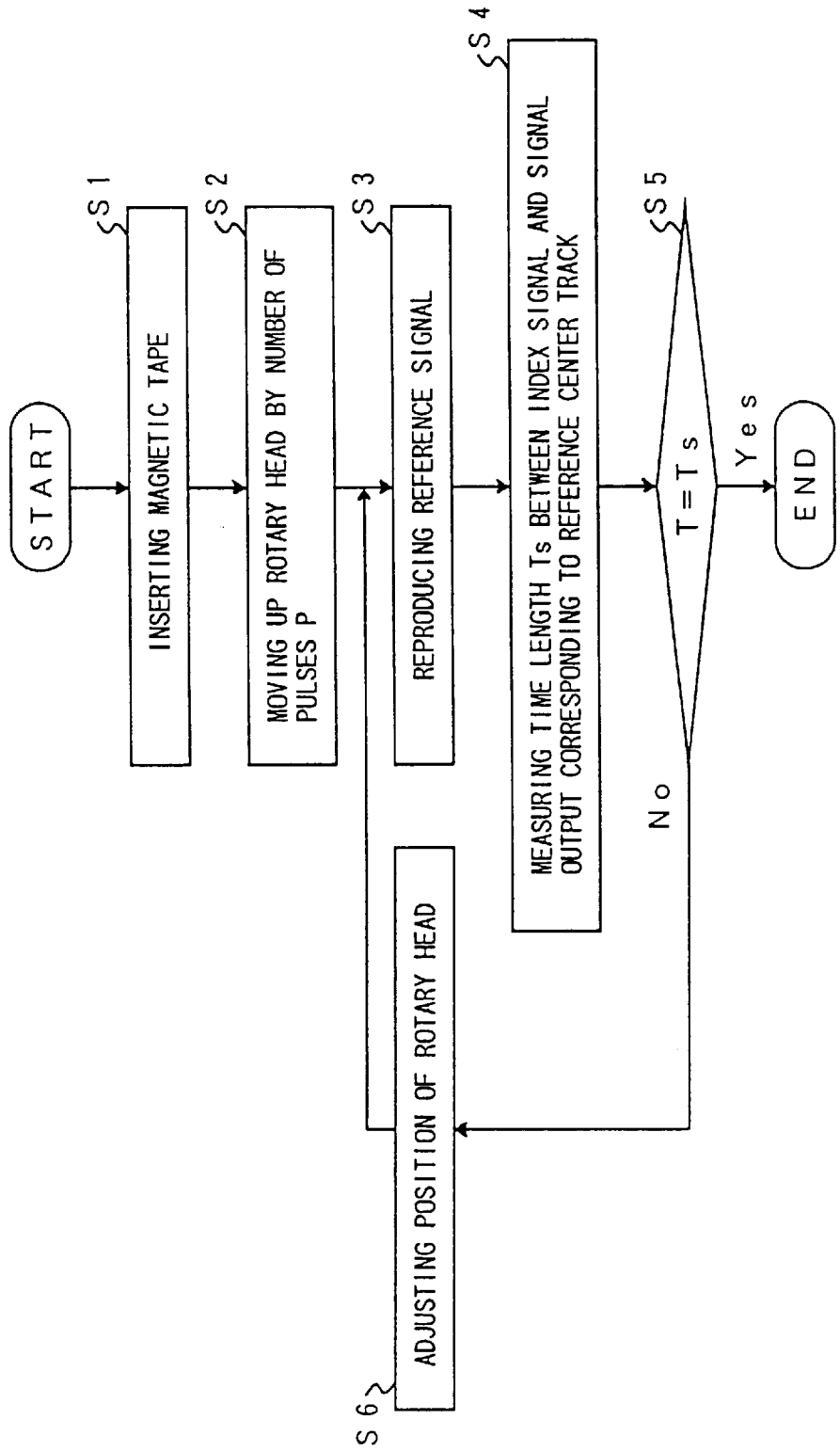

METHOD OF POSITIONING A MAGNETIC HEAD

This is a divisional application of copending U.S. patent application Ser. No, 08/278,938 filed Jul. 22, 1994, now pending.

BACKGROUND OF THE INVENTION

1. Field of the Invention

The present invention generally relates to a magnetic tape memory device, and particularly relates to a method of and an apparatus for positioning a magnetic head relative to a magnetic tape in a direction along the width of the magnetic tape in a magnetic tape memory device which has a rotary head.

2. Description of the Prior Art

In computers, for example, the magnetic tape is used as an additional large volume memory media or as a backup memory media for copying information stored in memory devices such as hard-discs. A magnetic tape is wrapped around a pair of tape reels which is contained in a data cartridge, and a torque roller for rotating the pair of reels is provided on the front face of the data cartridge. When the data cartridge is inserted into a magnetic tape memory device, the magnetic tape memory device rotates the pair of reels by conveying torque through the torque roller. The magnetic tape is driven just inside the front face of the data cartridge, and the recording or reproducing of information is carried out by a magnetic head which is positioned so as to touch the magnetic tape.

Regarding such a memory device, there are methods in which a rotary head is used instead of a fixed conventional head in order to increase the memory volume, and one of these methods is a semi-circle scanning method.

FIGS. 1A and 1B show the semi-circle scanning method. As shown in FIG.1A, the recording and reproducing of information is carried out by rotating a rotary head 12 with magnetic heads 12b mounted on the perimeter of a head holder 12a and by driving a magnetic tape 11 in a direction A. In recording and reproducing information, the magnetic heads 12b touch the surface of the magnetic tape 11.

Since the magnetic heads 12b revolve around the center of the head holder 12a, record tracks 11a formed on the surface of the magnetic tape 11 have a shape of an arc. Thus, when reproducing information, the positioning of the rotary head 12 relative to the magnetic tape 11 has to be precise in order to obtain a correctly reproduced signal. To this end, the position of the rotary head 12 relative to the direction along the width of the magnetic tape 11 is strictly controlled by using a servo method.

A servo method requires appropriate data as a basis for control. This data is provided as servo data P, Q, and R as shown in FIG. 1B, where the servo data Q and R are recorded near the edges of the magnetic tape 11, and the servo data P is recorded at the center. The servo data P, Q, and R are recorded such that the distance between P and Q and the distance between P and R are the same. When reproducing information, the rotary head 12 is controlled to be positioned in a manner which satisfies the two conditions described below. First, the time distance between two signals reproduced from the servo data P and Q is the same as the time distance between two signals from the servo data P and R. Second, the address numbers of the servo data P, Q, and R are all the same. Here, the address numbers of the servo data P, Q, and R are recorded at the time of recording information, and are all made equal within one track.

FIGS. 2A and 2B show a schematic illustration of a rotary head unit 10. In the rotary head unit 10 of FIG. 2A, the magnetic heads 12b are provided on the perimeter of the head holder 12a, which is rotated by a head motor 13. The head motor 13 is mounted on a supporting base 14.

Tape guides 15a and 15b which position the magnetic tape 11 are provided on both sides of the head holder 12a. Supporting plates 16a and 16b (not shown) are provided on the sides of the supporting base 14 at approximately the center thereof. The supporting base 14 can rotate about rods 17a and 17b (not shown) in a direction B-C (a direction along the width of the magnetic tape 11). Also, the supporting base 14 is provided near the back end thereof with a voice coil unit 18 to control the movement of the supporting base 14 in the direction B-C.

The positioning of rotary head 12 relative to the magnetic tape 11 is carried out by controlling electric current provided for the voice coil unit 18 on the basis of the signals reproduced from the servo data P, Q, and R.

However, since the rotary head 12 is rotated around the rods 17a and 17b when its relative position to the magnetic tape 11 is being controlled, movement of the rotary head 12 in the direction B-C draws a shape of an arc as shown in FIG. 2B. Thus, the angle of the rotary head 12 relative to the surface of the magnetic tape 11 varies according to the position of the rotary head 12. This means that a reproduced signal has a proclivity to become unstable, which in turn means that the positioning of the rotary head 12 is also unstable.

Accordingly, there is a need in the field of magnetic tape memory devices for a method of, and an apparatus for, positioning a rotary head relative to a magnetic tape while keeping a constant angle between the rotary head and the surface of the magnetic tape.

SUMMARY OF THE INVENTION

Accordingly, it is a general object of the present invention to provide a method and an apparatus which satisfies the need described above.

It is another and more specific object of the present invention to provide an apparatus for positioning a rotary head relative to a magnetic tape while keeping a constant angle between the rotary head and the surface of the magnetic tape.

In order to achieve this object, according to the present invention, an apparatus for positioning at least one magnetic head relative to a magnetic tape for recording and reproducing information includes a head unit for holding at least one magnetic head and a moving unit for moving the head unit parallel to a surface of the magnetic tape in a direction along the width of the magnetic tape so that the head unit is kept at a constant angle relative the surface of the magnetic tape.

In a preferred embodiment of the present invention, the apparatus further includes a supporting unit for enabling the head unit to pivot on an axis perpendicular to the surface of the magnetic tape. Thus, the head unit can move in a direction along the width of the magnetic tape while being kept at a constant angle relative to the surface of the magnetic tape.

It is yet another object of the present invention to provide a method of positioning a rotary head relative to a magnetic tape.

In order to achieve this object, according to the present invention, a method of positioning at least one magnetic head relative to a magnetic tape for recording and reproducing information, which at least one magnetic head circles around an axis perpendicular to the magnetic tape, includes the steps of reproducing signals by the at least one magnetic head from a reference magnetic tape, each of the signals being recorded in a longitudinal line at a different transverse position of the reference magnetic tape, positioning the axis relative to the reference magnetic tape in a predetermined transverse position of the reference magnetic tape by using the signals, creating reference data regarding the predetermined transverse position, and secondly positioning the axis relative to the magnetic tape by using the reference data. Since the positioning of the axis is based on the reference data created by using the reference magnetic tape, the positioning of the axis can be highly precise, variations in magnetic tape cartridges or magnetic tape memory devices due to manufacturing variations can be compensated for, and the time required for positioning the axis can be reduced by a significant amount.

Other objects and further features of the present invention will be apparent from the following detailed description when read in conjunction with the accompanying drawings.

BRIEF DESCRIPTION OF THE DRAWINGS

FIG. 8 shows a relation between time difference t1 minus t2 and deviation of the rotation center of the rotary head from the center of the magnetic tape; and FIG. 9 is a flow chart of a procedure for positioning the rotary head relative to a magnetic tape.

DESCRIPTION OF THE PREFERRED EMBODIMENTS

Figure 3:
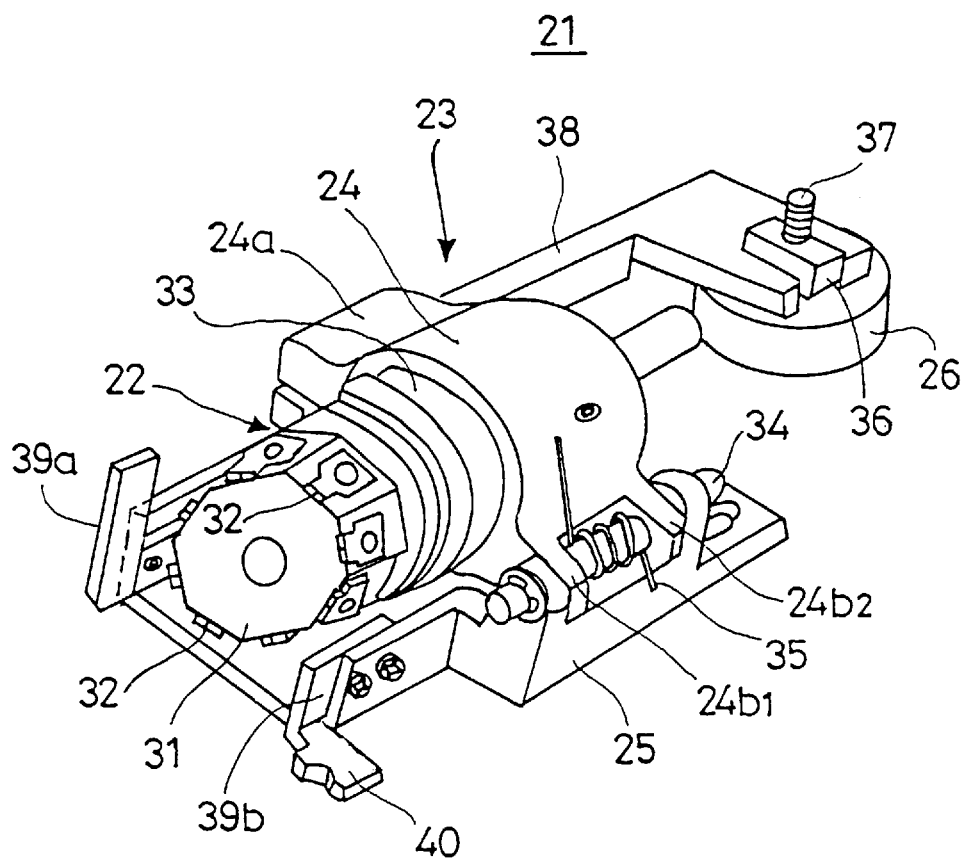
FIG. 3 is a perspective view of a head positioning unit according to the present invention.

FIG. 3 shows a perspective view of a head positioning unit according to a preferred embodiment of the present invention. A head positioning unit 21 shown in FIG. 3, which is provided in a magnetic tape memory device, comprises a rotary head 22 and a head base 23. The head base 23 comprises a head holder 24, a holder base 25, and a stepping motor 26.

The rotary head 22 is provided with magnetic heads 32 mounted on a rotating part 31 at equal intervals. The rotating part 31 is rotated by a driving motor 33.

Figure 4A:
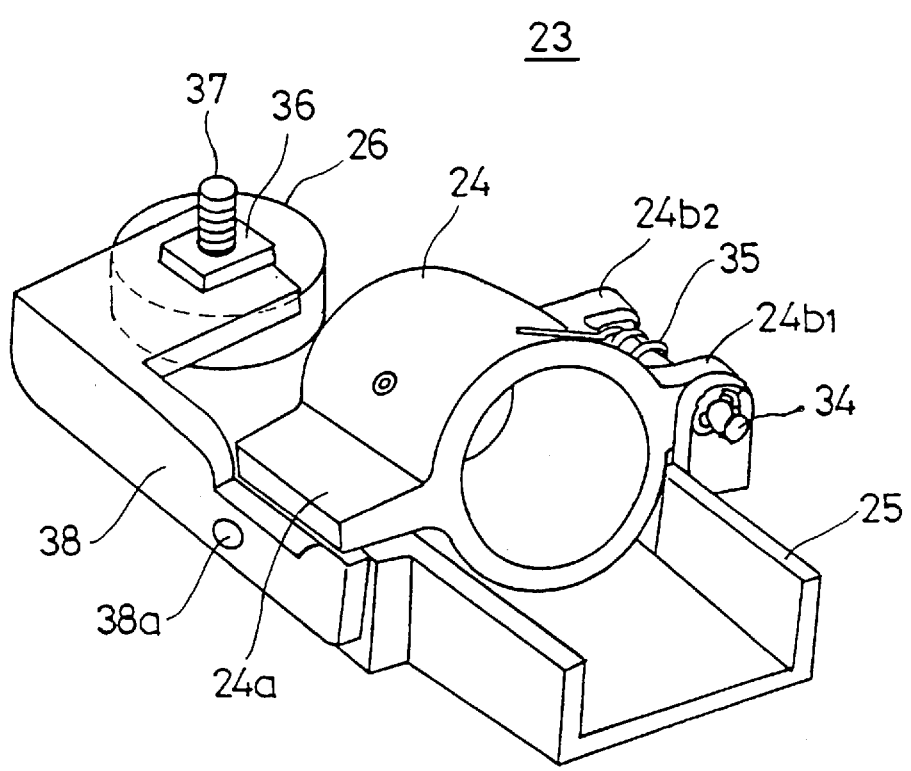
FIGS. 4A and 4B are a perspective view of a head base of FIG. 3 and a side view of a rotary head of FIG. 3, respectively.

FIG. 4A is a perspective view of the head base 23, whose structure will be described with reference to FIGS. 3 and 4A. The head base 23 in FIG. 4A is shown from the direction opposite to that of FIG. 3.

In FIGS. 3 and 4A, the head holder 24 of the head base 23 is used for containing the driving motor 33, and has a cylindrical shape. The head holder 24 has on one side a protruding part 24a, which is in contact with a link 38, and has on the opposite side hinge parts 24b1 and 24b2, which are connected to the holder base 25.

The holder base 25 serves as a base for mounting the head holder 24, and is mounted on a frame base of the magnetic tape memory device. A rod 34 connects the head holder 24 and the holder base 25 together, and a spring 35 pushes down the head holder 24, so that the protruding part 24a is pushed against the link 38. The rod 34 extends in a direction perpendicular to the surface of the magnetic tape.

The link 38 is mounted on the holder base 25 by a rod 38a, has one end in contact with the protruding part 24a, and has the opposite end fixed to a nut 36. A lead screw 37, which is rotated by a stepping motor 26, is fitted into the nut 36. With the head holder 24 being pushed against one end of the link 38, the stepping motor 26 can control the position of the head holder 24 by rotating the lead screw 37 to move the nut 36 and the opposite end of the link 38 up and down. Since the link 38 rotates around the rod 38a, the head holder 24 is moved up when the nut 36 is moved down, and the head holder 24 is moved down when the nut 36 is moved up. In this movement, the head holder 24 pivots on the rod 34.

The stepping motor 26 is driven according to servo signals which will be described later.

Figure 4B:
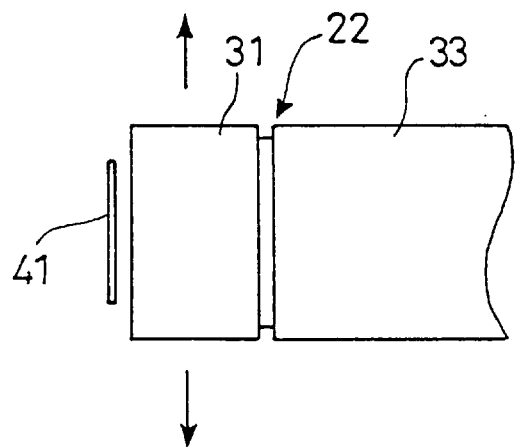

FIG. 4B shows the movement of the rotary head 22. As noted above, the head holder 24 of FIG. 4A pivots on the rod 34, so that the rotary head 22 moves in a direction parallel to the surface of a magnetic tape 41. Thus, the angle of the rotary head 22 relative to the surface of the magnetic tape 41 does not vary as the rotary head 22 moves.

With reference to FIG. 3 again, tape guides 39a and 39b are provided for positioning the magnetic tape relative to the rotary head 22. Also, a stopper 40 is integrally formed with the tape guide 39b, and serves as a unit for positioning a cartridge containing a magnetic tape.

The driving motor 33 of FIG. 3 provides an index signal to indicate a certain position of the rotary head 22 with regard to its rotational angle. That is, when the rotary head 22 rotates to come into a predetermined position once in 360 degrees, the driving motor 33 rotating the rotary head 22 outputs an index signal. This index signal is used for determining the position of the rotary head 22. The use of the index signal will be described later.

Figure 5A:
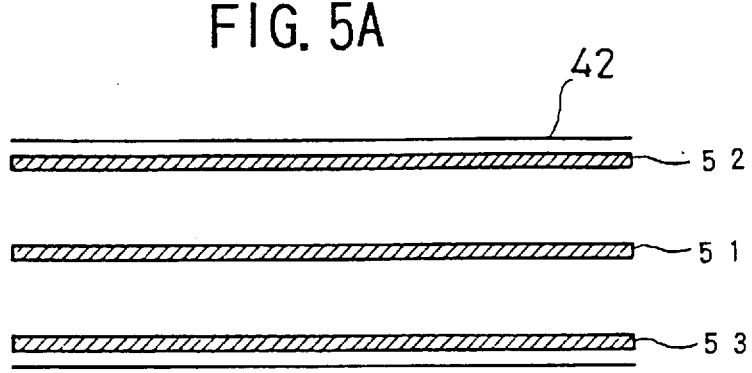
FIGS. 5A and 5B are illustrative drawings showing reference tracks recorded on a magnetic tape and magnetization of a track, respectively.
Figure 5B:
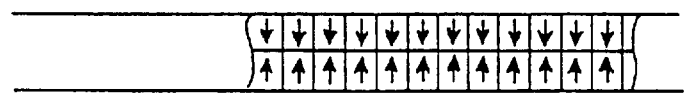
Figure 6:
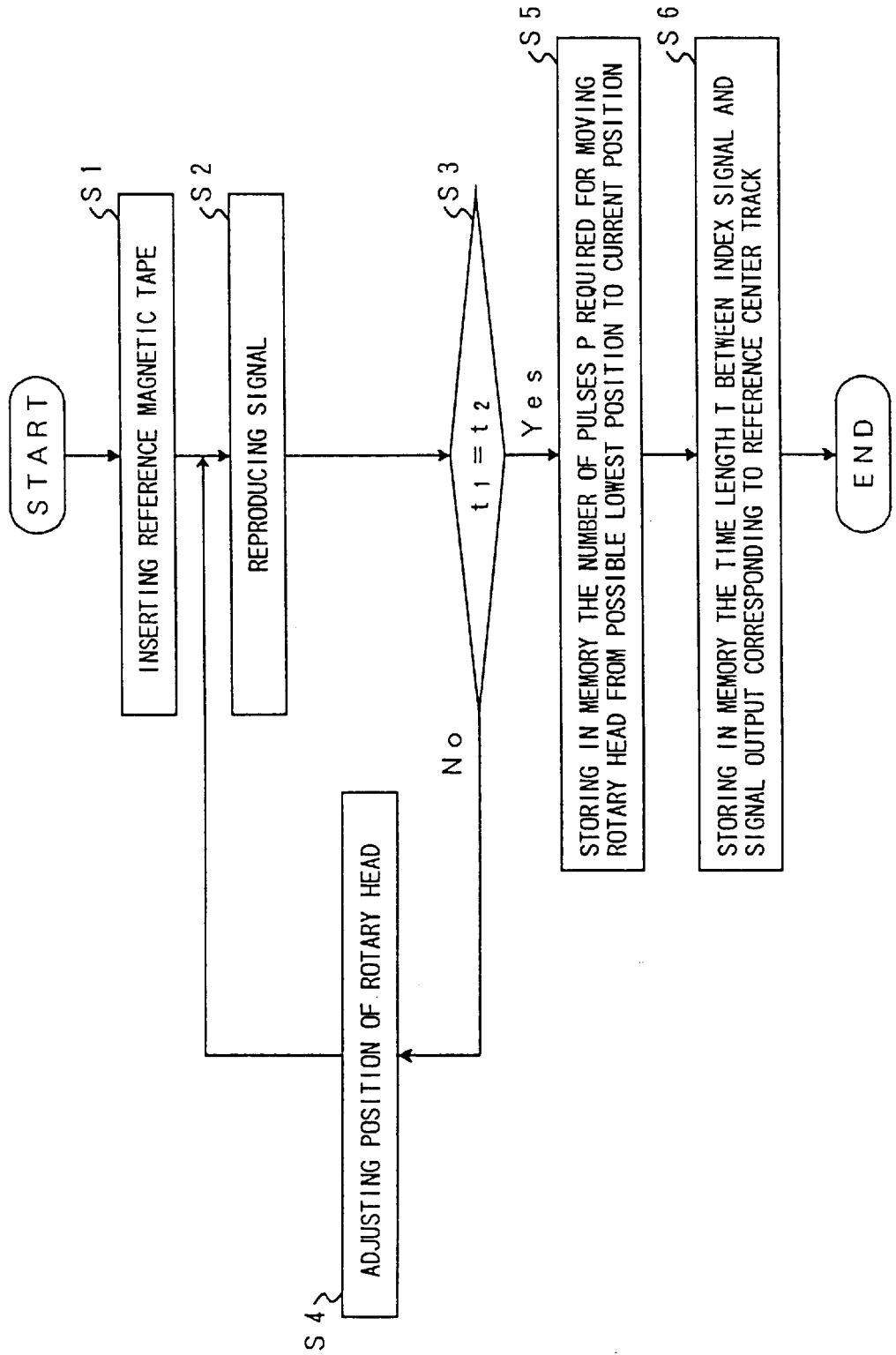
FIG. 6 is a flow chart of a procedure for positioning the rotary head relative to a reference magnetic tape according to the present invention.

FIGS. 5A and 5B show control data recorded on a reference magnetic tape 42, and FIG. 6 shows a flow chart for generating reference data by using the reference magnetic tape 42, which data is used for positioning the rotary head 22 relative to the magnetic tape 41.

As can be inferred from the above, there are two different phases involved in the positioning of the rotary head 22 relative to the magnetic tape 41. First, reference data is obtained by using the reference magnetic tape 42 prior to recording and reproducing information on the magnetic tape 41. Second, the rotary head 22 is positioned relative to the magnetic tape 41 by using the reference data obtained for this positioning.

In FIG. 5A, a reference center track 51 is formed in the center of the reference magnetic tape 42, and signal tracks 52 and 53 are formed at equal distances from the reference center track 51. In these tracks 51, 52, and 53, remnant magnetic domains are formed in opposing directions as shown in FIG. 5B.

Figure 7A:
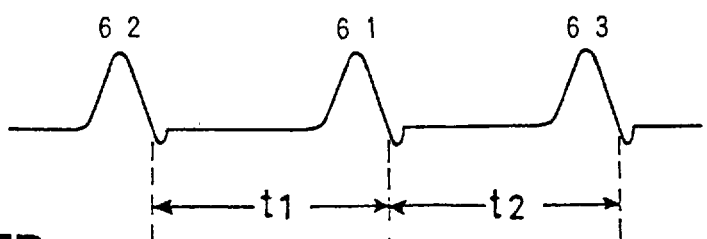
FIGS. 7A and 7B are illustrative drawings showing reproduced signals corresponding to the reference tracks and showing an index signal, respectively.

In FIG. 6, at a step S1, the reference magnetic tape 42 is inserted into the magnetic tape memory device. Upon this insertion, a reproducing operation starts according to a reproducing procedure of the device, and, at a step S2, a reproduced signal is obtained. As shown in FIG. 7A, the reproduced signal has three signal outputs 61, 62, and 63 appearing in a time sequence, which correspond to the tracks 51, 52, and 53, respectively. Here, the time length between signal outputs 61 and 62 is referred to as t1, and the time length between signal outputs 61 and 63 as t2.

At a step S3, t1 and t2 are compared with one another. If t1 is equal to t2, it is determined that the current position is the center of the rotation of the rotary head 22, and a step S5 is the next step to proceed. If t1 is not equal to t2, the procedure returns to the step S2 after adjusting the position of the rotary head 22 at a step S4. Then, the steps S2, S3, and S4 are repeated until t1 and t2 become equal.

FIG. 8 shows an illustration of the relation between the time difference t1 minus t2 and the deviation of the rotation center from the center of the reference magnetic tape 42. Here, it is assumed that the diameter of a magnetic head revolution is 7.62 mm, the distance between the reference center track 51 and each of the signal tracks 52 and 53 is 2 mm, and the rotation rate of the rotary head 22 is 7500 rpm. As shown in FIG. 8, when the rotation center is deviated by 1 $\mu$m from the center of the reference magnetic tape 42, the time difference t1 minus t2 is about 0.35 $\mu$sec. By using the relation shown in FIG. 8, the position of the rotary head 22 is adjusted at the step S4.

At the step S5, the number of pulses P applied to the stepping motor 26 in order to move the rotary head 22 from the possible lowest position to the current position is stored in a memory.

Figure 7B:
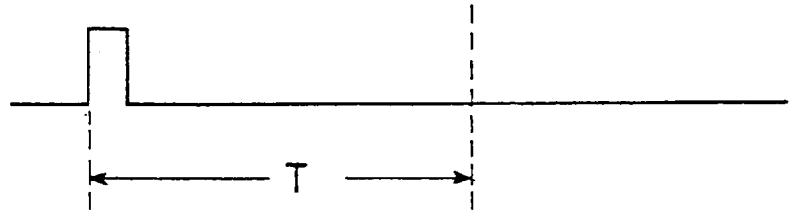

As noted above, the driving motor 33 generates an index signal, as shown in FIG. 7B, to indicate a predetermined position of the rotary head 22 with regard to its rotational angle. At a step S6, the time length T between this index signal and the signal output 61 corresponding to the reference center track 51 is stored in a memory.

Based on the number of pulses P and the time length T, the positioning of the rotary head 22 relative to a magnetic tape 41 is controlled as described below.

The following are the reasons for having to prepare the reference data. First, with the help of the reference data collected before the recording and reproducing of information on the magnetic tape 41, the positioning of the rotary head 22 relative to the magnetic tape 41 can be realized by using a single reference signal, which is only prerecorded at the BOT (Beginning Of Tape) of the magnetic tape 41 shown in FIG. 1B. Second, this positioning method can reduce by a significant amount the time needed to position the rotary head 22, compared to the case where three reference signals are used, even if such signals are prerecorded at the beginning of the magnetic tape 41.

FIG. 9 shows a flow chart of a procedure for positioning the rotary head 22 relative to a magnetic tape 41.

Figure 1A:
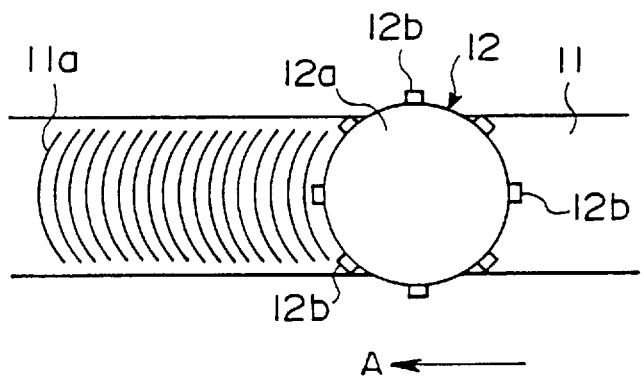
FIGS. 1A and 1B are illustrative drawings showing a rotary head along with a magnetic tape and servo data recorded on the magnetic tape, respectively.
Figure 1B:
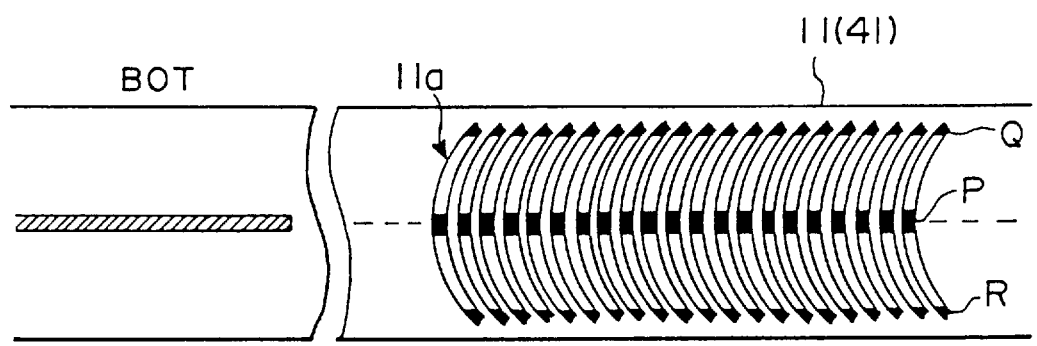
Figure 2A:
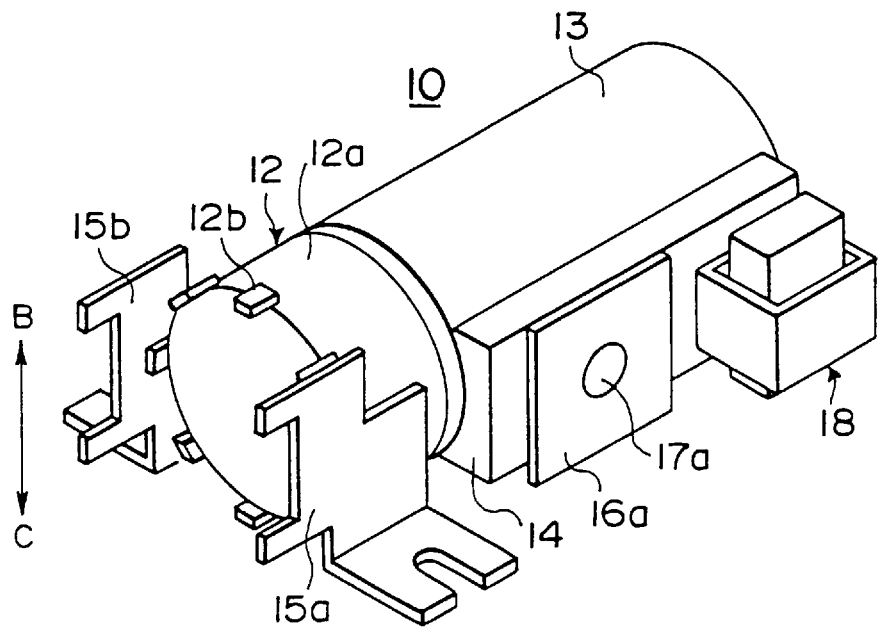
FIGS. 2A and 2B are a perspective view and a side view of a rotary head unit, respectively.
Figure 2B:
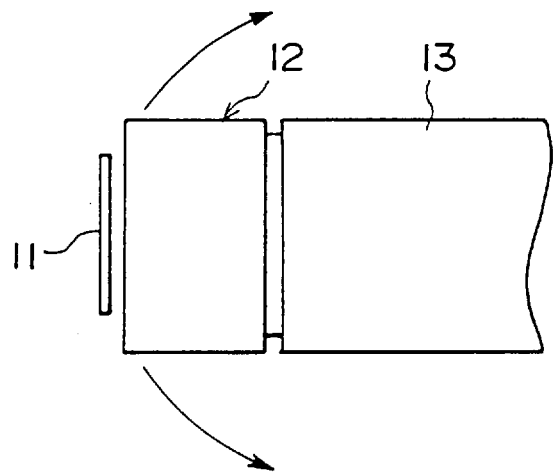

At a step S1, the magnetic tape 41, which has a reference signal prerecorded at the BOT as shown in FIG. 1B, is inserted into the magnetic tape memory device. After the insertion of the magnetic tape 41, the rotary head 22 is moved up by the number of pulses P at a step S2 so that the rotary head 22 is positioned at approximately the center of the magnetic tape 41. Then, the reference signal prerecorded at the BOT of the magnetic tape 41 is reproduced at a step S3.

At a step S4, the time length Ts between the index signal and the signal output 61 corresponding to the reference signal is measured. At a step S5, the time length Ts is compared with the time length T.

If Ts is equal to T, this is the end of the process. If Ts is greater than T, the rotary head 22 is moved down, and if Ts is smaller than T, the rotary head 22 is moved up. This adjustment of the position of the rotary head 22 is carried out at a step S6. Then, the steps S3, S4, S5, and S6 are repeated until Ts becomes equal to T. When Ts becomes equal to T, the rotary head 22 is positioned precisely in the center of the magnetic tape 41.

As described above, in positioning the rotary head 22 relative to the magnetic tape 41, the number of pulses P is used for initially positioning the rotary head 22 at approximately the center of the magnetic tape 41. Thus, a significant amount of time is saved, which time would otherwise have to be used for positioning the rotary head 22 at approximately the center of the tape by starting from an arbitrary initial position, which might be far away from the center.

In the head positioning unit according to the preferred embodiment of the present invention, a rotary magnetic head can be moved while being kept at a constant angle relative to the surface of the magnetic tape, so that stable reproduced signals can be obtained. Also, since the positioning of the rotary head relative to the magnetic tape is based on the reference data recorded on the magnetic tape, variations in the position of the magnetic tape inside the cartridge or the position of the rotary head inside the device due to manufacturing variations can be compensated for. Furthermore, the positioning of the rotary head is controlled by means of a stepping motor, which lowers the cost for manufacturing the device.

Further, the present invention is not limited to this embodiment, but various variations and modifications may be made without departing from the scope of the present invention.

What is claimed is:

1. A method of positioning at least one magnetic head relative to an information recording/reproducing magnetic tape, said positioning being carried out in a direction parallel to the width of the recording/reproducing magnetic tape and transverse to the length of said tape, the recording/reproducing magnetic tape having a surface applied to the magnetic head, said at least one magnetic head rotating about an axis perpendicular to the surface of the recording/reproducing magnetic tape, said method comprising the steps of:

reproducing a plurality of signals from said at least one magnetic head obtained from a reference magnetic tape, one of said signals being recorded from a longitudinal line located at a center transverse position of said reference magnetic tape, others of said signals being recorded from other longitudinal lines spaced at predetermined equal intervals from said center transverse position transversely across said reference magnetic tape;

moving the at least one magnetic head to position said axis relative to said reference magnetic tape in a predetermined transverse position of said reference magnetic tape by using said signals and so that time intervals between said one of reproduced signals and said other reproduced signals are equal so that said predetermined transverse position is said center transverse position of said reference magnetic tape, and so that said one reproduced signal occupies a center timing position between the timing of said other reproduced signals;

creating reference data regarding said predetermined transverse position comprising a first time length between an index signal and the reproduction of said one reproduced signal provided when said axis is in said center transverse position, and storing said reference data obtained from said reference tape in a memory; and thereafter reproducing a signal from said at least one magnetic head obtained from the recording/reproducing magnetic tape, said signal being recorded from a center longitudinal line of said recording/reproducing magnetic tape; and moving the at least one magnetic head to position said axis relative to the recording/reproducing magnetic tape by using said reference data obtained from said reference tape and stored in said memory, the movement being carried out until a second time length between said index signal and said signal recorded from said center longitudinal line of said recording/reproducing magnetic tape equals said first time length, thereby to position said at least one magnetic head relative to said recording/reproducing magnetic tape.

2. The method as claimed in claim 1, wherein said plurality of signals comprise three signals, one of said three signals being recorded from said longitudinal line in said center transverse position of said reference magnetic tape, the other two of said three signals being recorded from longitudinal lines parallel to said longitudinal line and at equal time intervals from said center transverse position.

* * * * *